US008428254B2

(12) United States Patent
Potkonjak

(10) Patent No.: US 8,428,254 B2
(45) Date of Patent: Apr. 23, 2013

(54) DISTRIBUTED GENERATION OF MUTUAL SECRETS

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 1000 days.

(21) Appl. No.: 12/415,060

(22) Filed: Mar. 31, 2009

(65) Prior Publication Data

US 2010/0250938 A1 Sep. 30, 2010

(51) Int. Cl.
*H04L 9/00* (2006.01)

(52) U.S. Cl.
USPC .......................................................... 380/44

(58) Field of Classification Search ................ None
See application file for complete search history.

(56) References Cited

U.S. PATENT DOCUMENTS

| 5,060,263 | A | * | 10/1991 | Bosen et al. | ................ | 713/184 |
| 5,349,642 | A | * | 9/1994 | Kingdon | ................ | 713/161 |
| 7,369,677 | B2 | * | 5/2008 | Petrovic et al. | ................ | 382/100 |
| 2002/0097724 | A1 | * | 7/2002 | Halme et al. | ................ | 370/392 |
| 2003/0110381 | A1 | * | 6/2003 | Aoshima et al. | ................ | 713/168 |
| 2003/0185391 | A1 | * | 10/2003 | Qi et al. | ................ | 380/44 |
| 2006/0161750 | A1 | * | 7/2006 | Perkins et al. | ................ | 711/164 |

OTHER PUBLICATIONS

Abdalla et al., Efficient Two-Party Password-Based Key Exchange Protocosl in the UC framework, Proceedings of the Cryptographers, Track at the RSA Conference, Apr. 2008.*
Kirovski et al., "Enabling Trusted Software Integrity", ACM 1-58113-574-2/02/0010, 2002.*
Koizumi et al., "A Revised Transformation Protocol for Unconditionally Secure Secret Key Exchange", Springer Science+Business Media, Oct. 2007.*
Lamport, "Password Authentication with INsecure Communication" ACM 001-0782-81/1100-770, 1981.*
Diffie Whitfield et al., "New Directions in Cryptography," IEEE International Symposium on Information Theory in Ronneby, Sweden, Jun. 21-24, 1976, pp. 29-40.
R.L. Rivest et al., "A Method for Obtaining Digital Signatures and Public-Key Cryptosystems," Communications of the ACM, vol. 21, No. 2, Feb. 1978, pp. 120-126.
Philippe Flajolet et al., "Birthday Paradox, Coupon Collectors, Caching Algorithms and Self-Organizing Search," Institut National de Recherche en Informatique et en Automatique, No. 720, Aug. 1987, pp. 1-17.
Kazuo Nishimura et al., "Probability to meet in the middle," Keio University, Department of Mathematics, Research Report, KSTS/RR-87/006, Aug. 16, 1987, pp. 1-10.
Michael J. Fischer et al., "Multiparty Secret Key Exchange Using a Random Deal of Cards," Proceedings of Crypto, 1991, 15 pgs.
Eli Biham, "New Types of Cryptanalytic Attacks Using Related Keys," Journal of Cryptology, vol. 7, No. 4, Dec. 1994, pp. 229-246.

(Continued)

*Primary Examiner* — Peter Poltorak
(74) *Attorney, Agent, or Firm* — Brundidge & Stanger, P.C.

(57) ABSTRACT

Embodiments provide methods, apparatuses, and systems for determining numbers that correspond to a collection of matching derivative numbers. The matching derivative numbers may be included in both a first plurality of derivative numbers selected by a first computing system, and in a second plurality of derivative numbers selected by a second computing system. The numbers may be used to compute a secret. The secret may be used for secure communication between the first and second computing systems.

18 Claims, 5 Drawing Sheets

OTHER PUBLICATIONS

Mike Burmester et al., "A Secure and Efficient Conference Key Distribution System," Lecture Notes in Computer Science, vol. 950, 1995, pp. 275-286.

Ran Canetti et al., "Analysis of Key-Exchange Protocols and Their Use for Building Secure Channels," Lecture Notes in Computer Science, vol. 2045, 2001, pp. 453-474.

Bloom, D. M., "A birthday problem," The American Mathematical Monthly, vol. 80, pp. 1141-1142 (1973).

Cramer, R. and Shoup, V., "Universal Hash Proofs and a Paradigm for Adaptive Chosen Ciphertext Secure Public Key-Encryption," in proceedings of Eurocrypt '02, LNCS 2332, pp. 45-64 (2002).

Cramer, R., et al., "A Practical Public Key Cryptosystem Provably Secure Against Adaptive Chosen Ciphertext Attack," Proceedings of the 18th Annual International Cryptology Conference on Advances in Cryptology, ACM, pp. 1-13 (1998).

Dasgupta, A., "The matching, birthday and the strong birthday problem: a contemporary review," Journal of Statistical Planning and Inference, vol. 130, Issues 1-2, Mar. 1, 2005, pp. 377-389.

Diaconis, P. and Mosteller, F., "Methods for studying coincidences," Journal of the American Statistical Association, vol. 84, No. 408 pp. 853-861 (1989).

Diffie, W., et al., "Exhaustive Cryptanalysis of the NBS Data Encryption Standard," The Institute of Electrical and Electronics Engineers, Inc. pp. 1-12 (1977).

Diffie, W., et al., "New Directions in Cryptography," Transactions on Information Theory, IEEE, vol. IT-22, No. 6, pp. 644-654 (1976).

Flajolet, P., et al., "Analytic urns," Institute of Mathematical Statistics, vol. 33, No. 3, pp. 1200-1233 (2005).

Flajolet, P., et al., "Birthday paradox, coupon collectors, caching algorithms and self-organizing search," Discrete Applied Mathematics, vol. 39, No. 3, pp. 207-229 (1992).

Holst, L., "Extreme value distributions for random coupon collector and birthday problems," Extremes vol. 4, No. 2, pp. 129-145 (2001).

Kotz, S. et al., "Advances in urn models during the past two decades," Advances in combinatorial methods and applications to probability and statistics, Birkhauser, Boston, pp. 203-257 (1997).

Merkle, R. C., "Secure Communications Over Insecure Channels," Communications of the ACM, vol. 21, No. 4, pp. 294-299, (1978).

Mase. S., "Approximations to the birthday problem with unequal occurrence probabilities and their application to the surname problem in Japan," Ann. Inst. Statist. Math., vol. 44, No. 3, pp. 479-499 (1992).

Messerges T. S. and Dabbish E. A., "Digital Rights Management in a 3G Mobile Phone and Beyond," Proceedings of the 3rd ACM Workshop on Digital Rights Management, Oct. 27, 2003, pp. 27-38.

Ngai, E. W. T, and Gunasekaran, A., "A review for mobile commerce research and applications," Decision Support Systems, vol. 43, Issue 1, pp. 3-15 (2007).

* cited by examiner

Computer Program Product  701

Signal-Bearing Medium   703

705
One or more instructions to:
- determine n matching numbers that correspond to a collection of n matching derivative numbers
- compute a secret using at least one of the n matching numbers
- select a first plurality of numbers and generate a first plurality of derivative numbers using corresponding ones of the first plurality of numbers
- receive a second plurality of derivative numbers, and compare the first plurality of derivative numbers with the second plurality of derivative numbers to determine the collection of n matching derivative numbers
- send indicia indicating corresponding ones of the second plurality of derivative numbers that are in the collection of n matching derivative numbers
- compute the secret using both a previously-computed secret and the at least one of the n matching numbers

Figure 7

DISTRIBUTED GENERATION OF MUTUAL SECRETS

BACKGROUND

Various techniques to exchange session keys for secured, authenticated or encrypted communications, as well as other secrets, are available. To encrypt communications between two networked devices, both sides must typically have the same encryption key. The sending device encrypts the communication using the session key, and the receiving device decrypts the communication using the session key to recover the original message. The two devices may be manually configured with the shared session key. Alternatively, some sort of public key exchange could be used. Although much effort has been made in the areas of public key cryptography, no provably secure method of communication has been proposed. Also, these methods are sensitive to physical and side-channel attacks.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a computing program product in accordance with various embodiments, all arranged in accordance with the present disclosure.

DETAILED DESCRIPTION OF EMBODIMENTS

Figure 1:
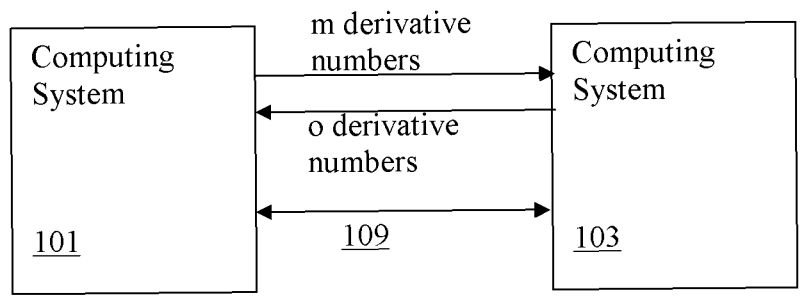
FIG. 1 illustrates a block diagram of two computing systems each configured to independently generate a secret in accordance with various embodiments.

In the following detailed description, reference is made to the accompanying drawings which form a part hereof, and in which are shown by way of illustration embodiments in which embodiments may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

This disclosure is drawn, inter alia, to methods, apparatus, systems and computer program products related to distributed generation of secrets, such as a session key, password, private key, or other secrets.

Described embodiments may provide methods, apparatuses, and systems for distributed generation of secrets, such as a session key, password, private key, or other secret. In embodiments, two or more communicating systems may each randomly, or pseudo-randomly, select a plurality of numbers. Because the selection may be random or pseudo-random, each of the two or more systems may be very likely to select different pluralities of numbers. Each system may then generate derivative numbers (such as for example hash values) for each number in each of the pluralities, exchange the derivative numbers, independently search for any matches (i.e. determine any derivative numbers that collide), and determine the randomly-selected numbers that correspond to the matching derivative numbers. One or more of these matching numbers may be used to compute a secret, such as a session key or other secret. Because the two or more communicating systems may each independently select the numbers and generate the derivative numbers, they may be able to easily determine which numbers correspond to the matching derivative numbers, once the matching derivative numbers are determined.

Probability theory—such as the generalized birthday paradox—provides that if two sets of m numbers out of M possible numbers are randomly selected, m may be very small relative to M before a collision (match) is expected between any number in the first set and any number in the second set. M and m are typically integers. Thus, in embodiments, the communicating systems may need to exchange only a relatively small number of derivative numbers (i.e. m) to produce a likely match. A potential attacker may be able to detect the matching derivative numbers, but would likely need to separately generate a very large number of derivative numbers—likely closer to M—before discovering all matching numbers that correlate to the colliding derivative numbers. As an example, if each of the two or more communicating systems generates $10^{15}$ derivative numbers, an attacker may have to generate approximately $10^{30}$ derivative numbers to identify all matches. Generating $10^{15}$ numbers may be feasible using conventional systems; but generating $10^{30}$ numbers may be practically infeasible due at least to cost and power requirements.

Embodiments may be described as using random number selection. Such embodiments may be understood to include pseudo-random number selection. The more statistically random the number selection technique, the more difficult it may be for a potential attacker to re-create the randomly-selected numbers which may, in turn, make it more difficult for the potential attacker to compute the secret, such as a session key or other secret. Some embodiments may pre-establish or negotiate the range or ranges from which the numbers may be selected. In some embodiments, the two or more communicating systems may be configured to generate different quantities of randomly-selected numbers. The quantity of randomly-selected numbers generated by each may be according to its capabilities. In various embodiments, the range of numbers from which the numbers are selected may be predetermined or negotiated. The range or ranges may be the same or different for each of the two or more communicating systems. Not all numbers in a range may be selectable. Number selection techniques may be chosen that are weighted more heavily towards one part of the range or ranges (e.g. they may have non-uniform probability). This may increase the likelihood of a collision. The distribution and/or range or ranges of possible numbers may change as each successive one of a single plurality of numbers is selected. The ranges may be altered and/or randomized for each secret generated.

In some embodiments, the techniques used to generate the random numbers, generate the derivative numbers, and/or generate or compute the secrets may be pre-established. These techniques may be kept secret. These techniques may be openly-negotiated between the two or more communicating systems. In various embodiments, the two or more communicating systems may not need to rely on keeping any of these techniques hidden from a potential attacker to provide secure communications. The communicating systems may send false derivative numbers, may send only a part of each number, or may communicate only derivative numbers having specified characteristics. In some examples, multiple secrets may be generated for establishing multiple communication sessions.

Embodiments may include methods where a first computing system and a second computing agree on a set S of M numbers as well as a technique to create corresponding derivative numbers for any number from the set. Such methods may include determining, by the first computing system a first set of derivative numbers starting from randomly-selected plurality of numbers from the agreed-upon set S. The second computing system may also determine a second set of derivative numbers (which may have the same or a different amount of derivative numbers than the first set) starting from a randomly selected plurality of numbers from the agreed-upon set S. The methods may include communicating, from the first computing system to the second computing system the first set of derivative numbers, and communicating from the second computing system to the first computing system, the second set of derivative numbers. Embodiments may also include sending additional numbers, not part of the first or second set, to and from the first and second computing systems so as to obfuscate the first and set of derivative numbers to a potential attacker. Embodiments may include identifying, by the first and second computing systems, matching derivative numbers from the first and second sets of derivative numbers. Once identified, the first and second computing systems may use the set of matching derivative numbers to determine a set of matching numbers and to create a mutual composite secret by, for example, combining the set of matching numbers in a specific way that may be public. The first and second computing systems may then use the mutual composite secret for secure communication such as between the first and second computing system.

FIG. 1 illustrates a block diagram of two computing systems each configured to independently generate a secret, such as a session key or other secret in accordance with various embodiments of the present disclosure. Computing systems 101 and 103 may comprise general-purpose computing systems, special-purpose computing systems, handheld devices, personal data assistants, routers, firewalls, or other devices. In some embodiments, computing systems 101 and 103 need not be the same type of device or system. In various embodiments, computing system 101 and/or computing system 103 may each comprise one or more of these or other devices. Embodiments are not limited to computing systems comprising only one device. In embodiments, computing system 101 and/or computing system 103 may comprise a first device and a trusted other device configured to perform various calculations.

Computing system 101 may be configured to randomly or pseudo-randomly select a plurality of m numbers from M possible numbers. Computing system 101 may be configured to generate m derivative numbers (such as for example hash values) from each one of the m numbers. Computing system 101 may be configured to then communicate the generated m derivative numbers to computing system 103. In embodiments, the computing systems may communicate via a local area network, wide-area network, the Internet, a wireless network, or other network type. Embodiments are not limited to any network connection types or network topologies.

Computing system 103 may be configured to randomly or pseudo-randomly generate o derivative numbers from O possible numbers. In embodiments m and o may be the same. In the same or different embodiments, M and O may be the same. Computing system 103 may be configured to then generate o derivative numbers from each of the o numbers and it may be configured to communicate the o derivative numbers to computing system 101. In alternative embodiments, computing systems 101 and 103 may be configured to exchange the derivative numbers in blocks of one or more until there are a pre-determined number of matches.

Computing system 101 may be configured to compare the two sets of derivative numbers and to determine any derivative numbers present in both sets. In other words, computing system 101 may be configured to compare the two sets of derivative numbers and to determine a collection of matching derivative numbers. Computing system 101 may be configured to then determine which of the m randomly-selected numbers correspond to this collection of matching derivative numbers. To do this, computing system 101 may be configured to perform a lookup operation or other operation. In embodiments, computing system 101 may be configured to retain all of the m randomly-selected numbers, each of the corresponding m derivative numbers, and information correlating each of the m randomly-selected numbers with corresponding ones of the m derivative numbers. This information may be stored in a database.

Computing system 101 may be configured to compute a secret using one or more of the matching numbers. In embodiments, computing system 101 may be configured to use the one or more of the matching numbers as seed numbers. In other embodiments, computing system 101 may be configured to use the one more matching numbers as the secret.

Computing system 103 may be configured to perform similar functions to independently compute the same secret. Because both computing system 101 and computing system 103 may be configured to retain both the randomly-selected numbers and information correlating them with their corresponding derivative numbers, the computing systems may each be able to correlate individual ones of the m and o numbers to the matching derivative numbers. But a potential attacker may need to separately generate a very large number of derivative numbers before it could determine the numbers that correspond to the matching derivative numbers.

In embodiments, computing systems 101 and 103 may be configured to use techniques to generate the derivative numbers—such as for example hash functions—that are substantially deterministic. In other words, the techniques may reliably generate the same derivative number each time it is given the same input, and/or reliably generate a different derivative number if given a different input. Thus, as long as each computing system uses the same technique to generate the derivative numbers, computing systems 101 and 103 may be able to reliably, independently, and distributedly generate the same derivative number for each colliding randomly-selected number. This may allow for computing systems 101 and 103 to reliably determine, from the collection of matching derivative numbers, whether there are any matching (colliding) numbers, as well as the values of any matching numbers. Stated another way, a matching derivative number serves as a reliable indicator, to each of computing systems 101 and 103, that they both possess the number from which the matching derivative number was generated, without having to exchange the number itself. And because it can be reasonably assured that both computing systems possess the same randomly-selected number, each may be very likely to be able compute the same secret using that randomly-selected number. In this way, the secret may be computed in a distributed fashion.

In embodiments, computing systems 101 and 103 may be configured to use a technique to generate substantially non-reversible derivative numbers. A hash function is one example of such a technique. Substantially non-reversible derivative numbers may not be easily fed into some reverse function to determine the input used to generate them. Thus, in embodiments, a potential attacker may not be able to easily determine the one or more matching numbers using the matching derivative numbers without using a brute force attack. If the potential range of randomly-selected numbers is sufficiently large, then such a brute-force attack may be practically infeasible. In embodiments, it may be sufficient that the techniques used to generate the derivative numbers can not be reversed in significantly less than X steps, where $X^2$ is the number of numbers within the range or ranges or potential numbers. In embodiments, more or less robust techniques may be used.

Embodiments utilizing hash functions are not limited to any particular hash functions, but embodiments may include, for example, Message Digest 2 (MD2), MD4, MD5, Secure Hash Algorithm-0 (SHA-0), SHA-1, SHA-256/224, SHA-512/384, and others.

Computing system 101 and computing system 103 may each be configured to compute a secret using at least one of the matching numbers. Computing system 101 and computing system 103 may then be configured to communicate via secure connection 109 using the computed secret. Computing system 101 (as well as computer system 103) may be configured to send an at least partially encrypted message using the secret and/or decrypt a received encrypted message using the secret, such as for example where the secret is an encryption key.

In alternative embodiments, computing system 103 may be configured to determine the matching derivative numbers and, rather than transmitting all o derivative numbers to computing system 101, it may instead transmit either only the matching derivative numbers themselves, or indicia indicating the collection of matching derivative numbers. Such indicia might include, for example, indexes or pointers to the transmitted list of m derivative numbers. Computing system 101 may be configured to determine the one or more matching numbers that correspond to the matching derivative numbers in the same or similar way as described earlier.

Figure 2:
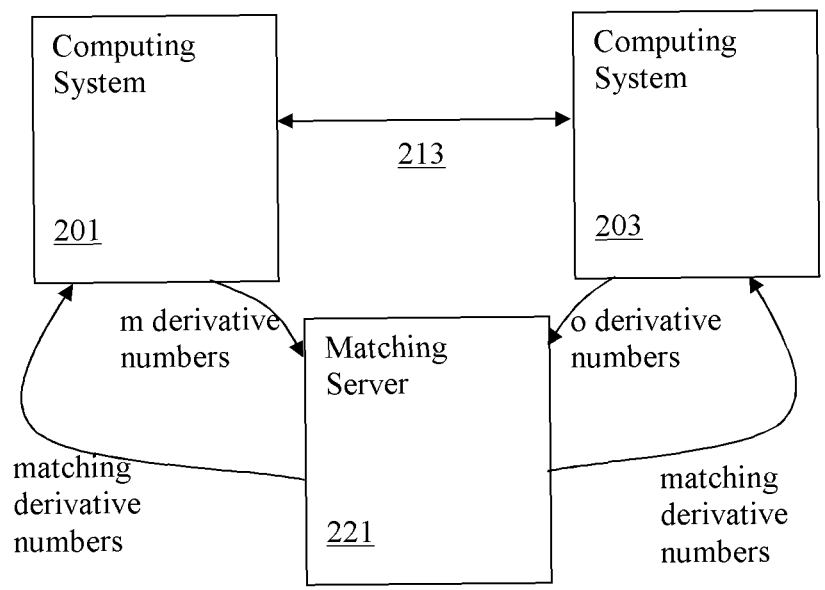
FIG. 2 illustrates a block diagram of two computing systems configured to generate a secret in a distributed fashion using a matching server in accordance with various embodiments.

FIG. 2 illustrates a block diagram of two computing systems configured to generate a secret in a distributed fashion using a matching server in accordance with various embodiments of the present disclosure. Computing system 201 may be configured to randomly or pseudo-randomly select m numbers and generate m derivative numbers as described elsewhere within this disclosure. Computing system 203 may be configured to randomly or pseudo-randomly select o numbers and generate o derivative numbers as described elsewhere within this disclosure. In embodiments, computing system 201 may be configured to transmit the m derivative numbers to matching server 221 while computing system 203 may be configured to transmit the o derivative numbers to matching server 221. Matching server 221 may be configured to compare the m derivative numbers to the o derivative numbers to determine which derivative numbers are in both sets; e.g. which derivative numbers are matching derivative numbers. Matching server 221 may be configured to communicate the matching derivative numbers to both computing system 201 and computing system 203. In alternative embodiments, Matching Server 221 may be configured to transmit either only the matching derivative numbers themselves, or indicia indicating the collection of matching derivative numbers. Such indicia might include, for example, indexes or pointers to the transmitted list of m derivative numbers. Computing systems 101 and 103 may be configured to independently determine which of the m and o randomly-selected numbers correspond to the matching derivative numbers and to use those matching numbers to independently compute a secret as described elsewhere within this disclosure.

Figure 3:
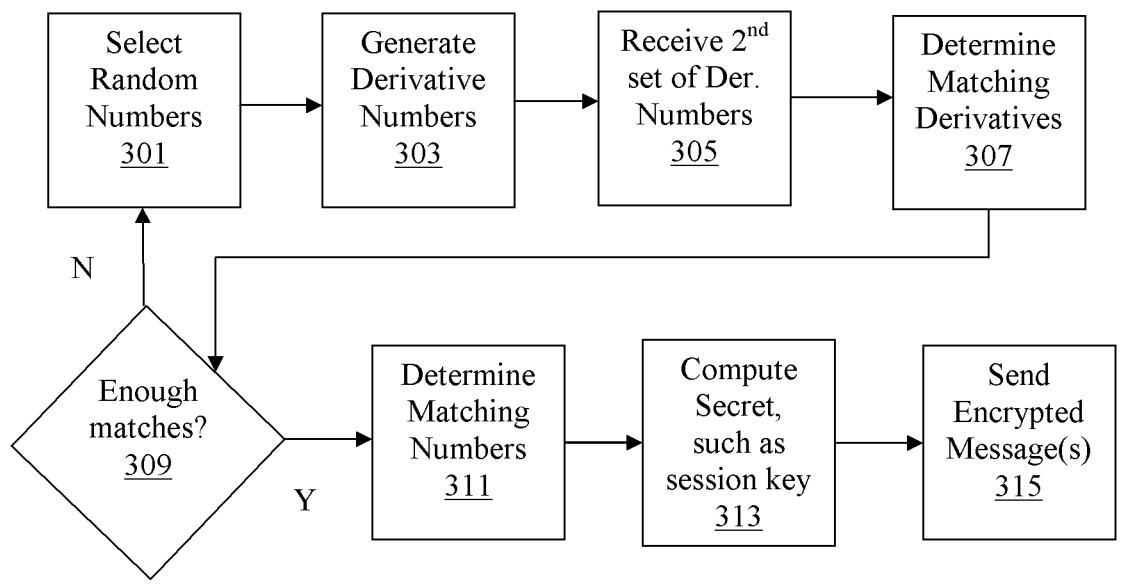
FIG. 3 illustrates a method of independent secret generation in accordance with various embodiments.

FIG. 3 illustrates a method of independent secret generation in accordance with various embodiments of the present disclosure. A computing system—such as for example computing system 101 of FIG. 1—may randomly or pseudo-randomly select a first plurality of numbers at block 301. The computing system may then generate derivative numbers—such as for example hash values—for each of the first plurality of numbers at block 303. The computing system may then receive a second plurality of derivative numbers that are associated with, or generated by, another computing system (such as, for example computing system 103 of FIG. 1). In embodiments, the computing system may receive the second plurality of derivative numbers directly from the other computing system. In alternative embodiments, the computing system may receive the second plurality of derivative numbers from a third computing system—such as for example matching server 221 of FIG. 2. The computing system may then compare the first plurality of derivative numbers to the second plurality of derivative numbers to determine a collection of matching derivative numbers 307.

If there are not at least a predetermined number of matching derivative numbers at block 309 (such as for example one or more matching derivative numbers), the computing system may in embodiments return to block 301, select a new plurality of randomly-selected numbers, and repeat the operations at blocks 303, 305 and 307 again. If there is at least the predetermined number of matching derivative numbers, the computing system may determine corresponding ones of the first plurality of numbers that correspond to the collection of matching derivative numbers at block 311. In embodiments, this may occur via a look-up operation or other operation. In some embodiments, the computing system may temporarily store the randomly-selected numbers and their corresponding derivative numbers so that the matching numbers can be easily identified once the collection of matching derivative numbers is determined. Once the matching numbers are identified, one or more of them may be used to compute a secret at block 313 and the computing system may send an encrypted, or partially-encrypted, message at block 315 using the computed secret.

Figure 4:
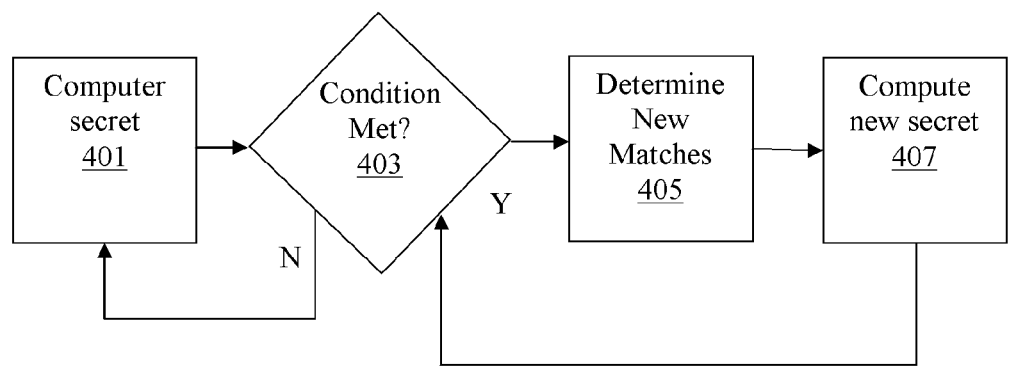
FIG. 4 illustrates a method of generating secrets in a distributed fashion using previously-generated secrets in accordance with embodiments.

FIG. 4 illustrates a method of generating secrets in a distributed fashion using previously-generated secrets in accordance with embodiments of the present disclosure. Once a secret is generated at block 401 as described elsewhere within this disclosure, a computing system may determine that a condition has been met at block 403. In embodiments, the condition may include a lapse of a predetermined time period, a request to compute a new secret, a loss of a connection, or other condition. If the condition is met, the computing system may select a plurality of random or pseudo-random numbers, a corresponding plurality of derivative numbers, determine a collection of matching derivative numbers, and determine a set of matching numbers at block 405 as described elsewhere within this specification. Once determined, one or more of the matching numbers may be used to generate a new secret at block 407 for secure communication with another computing system. In embodiments, the new secret may be generated using not only the one or more of the matching numbers, but also using the previously-generated secret. In such embodiments, an exclusive-or (XOR) operation may be performed on the previously-generated key and a temporary key computed using the new matching numbers. The result of such an XOR operation may then be used as the new secret. This may, in embodiments, make it more difficult for a potential attacker to successfully compute the secret than if the previously-generated key were not used to compute the new key. In embodiments, once a first secret is established, the subsequent number exchanges may be encrypted using the first secret. The process may, in embodiments, repeat as depicted in FIG. 4.

Figure 5:
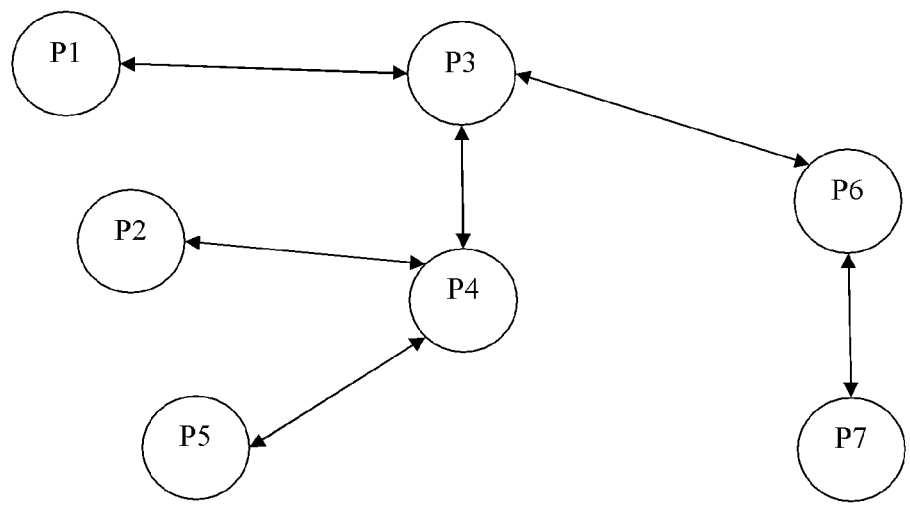
FIG. 5 illustrates a network of connected devices in accordance with various embodiments.

FIG. 5 illustrates a network of connected devices in accordance with various embodiments of the present disclosure. In some embodiments, an array of computing devices may be configured to communicate via intermediary devices as depicted in FIG. 5. For example, device P1 may be configured to establish a secure connection with device P3 using techniques as described elsewhere within this disclosure. And device P3 may be able to establish secure connections with device P4 and device P6 in like manner. Device P1 may then be configured to communicate securely through device P3 to any of devices P2, P4, P5, P6, and P7 via successive secure connections. In this way, each device need only maintain a small number of secure connections, while maintaining secure connectivity to many devices.

Figure 6:
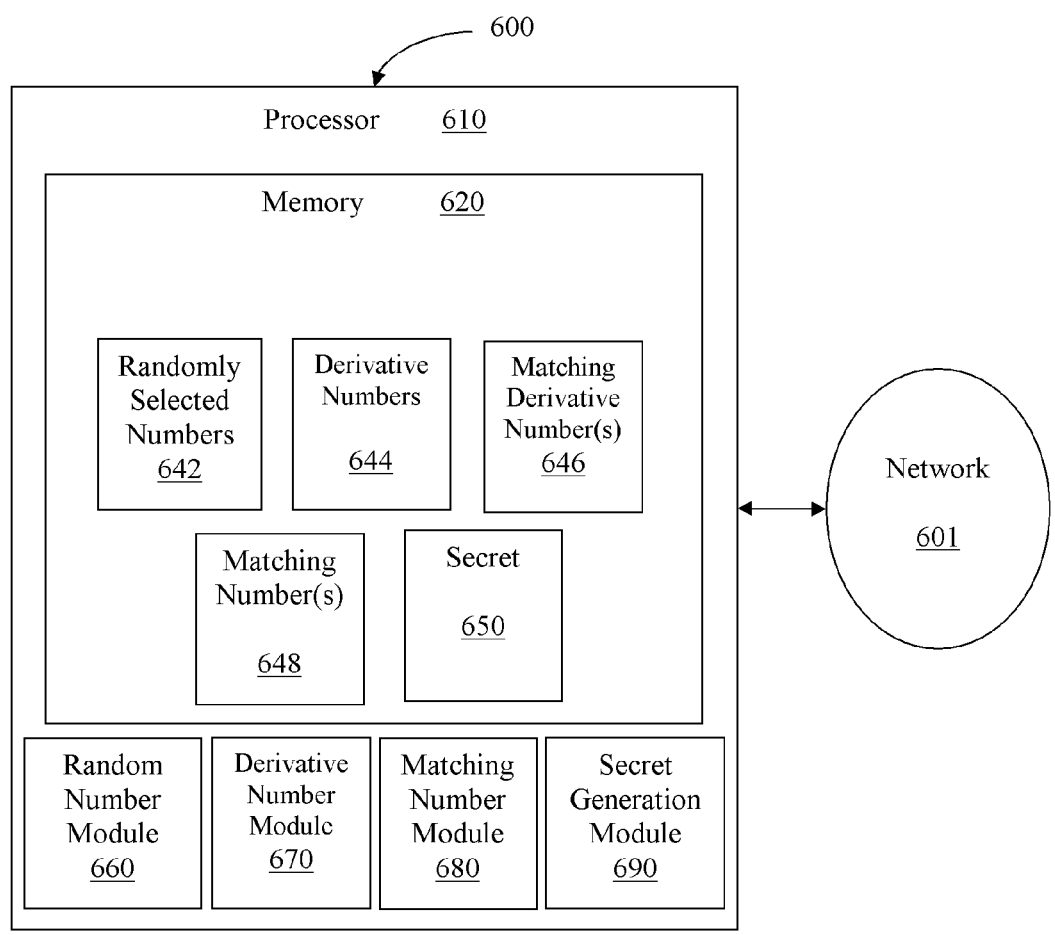
FIG. 6 illustrates a computing system configured in accordance with various embodiments.

FIG. 6 illustrates a computing system configured in accordance with various embodiments of the present disclosure. Computing system 600 may comprise processor 610 and memory 620 integrated with or coupled to processor 610. Computing system 600 may also include a random or pseudo-random number selection module 660 configured to randomly select a plurality of numbers 642. It may also include derivative number module 670 to generate corresponding derivative numbers 644 from each of the plurality of random or pseudo-random numbers 642. It may include matching number module 680 configured to match the plurality of corresponding derivative numbers 644 with another plurality of matching numbers from another computing device to determine a set of matching derivative numbers 646. In embodiments, computing device 600 may be configured to receive the other plurality of matching numbers from the other computing device via network 601. Matching number module 680 may also be configured to determine which of random numbers 642 correspond to the collection of matching derivative numbers 646 to determine one or more matching numbers 648. Computing device 600 may also include secret generation module 690 configured to compute secret 650 for secure communication between computing device 600 and the other computing device via network 601. In embodiments, secret generation module 690 may be configured to compute secret 650 using one or more matching numbers 648. In embodiments, secret generation module 690 may be configured to compute secret 650 using a previously-computed secret as well as one or more matching numbers 648. In embodiments, memory 620 may include one or more randomly selected numbers 642, derivative numbers 644, collection of matching derivative numbers 646, matching numbers 648, and secret 650.

In embodiments, processor 610 may be a general-purpose processor and memory 620 may be a hard disk drive, solid-state drive, random access memory (RAM), or other. In such embodiments, random number module 660, derivative number module 670, matching number module 680, and secret generation module 690 may represent a plurality of programming instructions stored within memory 620 or other memory and configured to program processor 610 to function as described within this disclosure. In embodiments, processor 610 may be an application-specific integrated circuit (ASIC), a field-programmable gate array (FPGA), or other logic device having specific functions built or programmed directly into it. In such embodiments, random number module 660 derivative number module 670, matching number module 680, and secret generation module 690 may be logical components within processor 610.

FIG. 7 illustrates a computing program product in accordance with various embodiments of the present disclosure. Computing program product 701 may comprise signal-bearing medium 703. Computing program product 701 may be, for example, a compact disk (CD), a digital versatile disk (DVD), a solid-state drive, a hard disk drive, or other computing program product having a signal-bearing medium. Embodiments are not limited to any type or types of computing program products. Signal bearing medium 703 may contain one or more instructions 705. Embodiments may have some or all of the instructions depicted in FIG. 7. Embodiments of computing program product 701 may have other instructions in accordance with embodiments described within this disclosure.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. A method, comprising:
   selecting, by a first computing system, a first plurality of numbers;
   generating a first plurality of derivative numbers, by the first computing system, using corresponding ones of the first plurality of numbers;
   selecting, by a second computing system, a second plurality of numbers;
   generating a second plurality of derivative numbers, by the second computing system, using corresponding ones of the second plurality of numbers;
   exchanging the first and second plurality of derivative number sets between the first and second computing system;
   determining, by the first computing system, n matching numbers that correspond to a collection of n matching derivative numbers, wherein the collection of n matching derivative numbers is included in both the first plurality of derivative numbers generated by the first computing system and in the second plurality of derivative numbers generated by the second computing system;
   computing, by the first computing system, a secret using at least one of the n matching numbers, wherein n is an integer; and
   using the secret for a communication session associated with the first and second computing systems.

2. The method of claim 1, wherein each of the first plurality of derivative numbers and the second plurality of derivative numbers comprises hashes.

3. The method of claim 1 further comprising receiving, by the first computing system, the second plurality of derivative numbers, and comparing, by the first computing system, the first plurality of derivative numbers with the second plurality of derivative numbers to determine the collection of n matching derivative numbers.

4. The method of claim 3, further comprising sending, by the first computing system to the second computing system, indicia indicating corresponding ones of the second plurality of derivative numbers that are in the collection of n matching derivative numbers.

5. The method of claim 3, further comprising sending, by the first computing system, the collection of n matching derivative numbers to the second computing system.

6. The method of claim 1, further comprising receiving, by the first computing system, the collection of n matching derivative numbers.

7. The method of claim 1, further comprising receiving, by the first computing system, indicia indicating corresponding ones of the first plurality of derivative numbers included in the collection of n matching derivative numbers.

8. The method of claim 1, further comprising sending, by the first computing system, the first plurality of derivative numbers to the second computing system.

9. The method of claim 1, wherein the computing the secret using the at least one of the n matching numbers further comprises computing the secret using both a previously-computed secret and the at least one of the n matching numbers.

10. The method of claim 9, the wherein computing the secret using the at least one of the n matching numbers further comprises performing an exclusive or operation on the previously-computed secret and a temporary secret, the temporary secret computed using the at least one of the n matching numbers.

11. An article of manufacture, comprising:
    a non-transitory computer-readable medium; and
    a plurality of programming instructions stored on the non-transitory computer-readable medium, the plurality of programming instructions cofigured to enable an apparatus, in response to execution of the plurality of programming instructions by the apparatus, to:

select a first plurality of numbers, and generate a first plurality of derivative numbers using corresponding ones of the first plurality of numbers;

the plurality of programming instructions further configured to enable another apparatus, in response to execution of the plurality of programming instructions by the another apparatus, to:

select a second plurality of numbers, and generate a second plurality of derivative numbers using corresponding ones of the second plurality of numbers;

exchanging the first and second plurality of derivate numbers between the apparatus and the another apparatus;

determine n matching numbers that correspond to a collection of n matching derivative numbers, wherein the collection of n matching derivative numbers is included in both the first plurality of derivative numbers generated by the apparatus and in the second plurality of derivative numbers generated by the another apparatus;

compute a secret using at least one of the n matching numbers, wherein n is an integer; and use the secret by the apparatus for a communication session associated with the apparatus and the another apparatus.

12. The article of manufacture of claim 11, wherein the plurality of programming instructions are further configured to enable the apparatus, in response to execution of the plurality of programming instructions by the apparatus, to:

receive the second plurality of derivative numbers, and compare the first plurality of derivative numbers with the second plurality of derivative numbers to determine the collection of n matching derivative numbers.

13. The article of manufacture of claim 12, wherein the plurality of programming instructions are further configured to enable the apparatus, in response to execution of the plurality of programming instructions by the apparatus, to:

send, to the other apparatus, indicia indicating corresponding ones of the second plurality of derivative numbers that are in the collection of n matching derivative numbers.

14. The article of manufacture of claim 11, wherein the plurality of programming instructions are further configured to enable the apparatus, in response to execution of the plurality of programming instructions by the apparatus, to:

compute the secret using both a previously-computed secret and the at least one of the n matching numbers.

15. An apparatus, comprising:

means for selecting a first plurality of numbers;

means for generating each derivative number in a first plurality of derivative numbers using corresponding ones of the first plurality of numbers, wherein another apparatus selects a second plurality of numbers, and wherein the another apparatus generates each derivative number in a second plurality of derivative numbers using corresponding ones of the second plurality of numbers;

means for exchanging the first and second plurality of derivative numbers between the apparatus and the another apparatus;

means for determining n matching numbers that correspond to a collection of n matching derivative numbers, wherein the collection of n matching derivative numbers is included in both the first plurality of derivative numbers generated by the apparatus and in the second plurality of derivative numbers generated by the another apparatus;

means for computing a secret using at least one of the determined n matching numbers;

wherein n is an integer; and means for using the secret by the apparatus for a communication session associated with the apparatus and another apparatus.

16. The apparatus of claim 15, further comprising means for receiving the collection of n matching derivative numbers.

17. The apparatus of claim 15, further comprising means for receiving indicia indicating corresponding ones of the first plurality of derivative numbers included in the collection of n matching derivative numbers.

18. The apparatus of claim 15, further comprising means for sending the first plurality of derivative numbers to the another apparatus.

* * * * *

UNITED STATES PATENT AND TRADEMARK OFFICE
CERTIFICATE OF CORRECTION

PATENT NO. : 8,428,254 B2
APPLICATION NO. : 12/415060
DATED : April 23, 2013
INVENTOR(S) : Potkonjak It is certified that error appears in the above-identified patent and that said Letters Patent is hereby corrected as shown below:

On the Title Page, item (56), under "OTHER PUBLICATIONS", in Column 1, Lines 1-2, delete "Efficient Two-Party Password-Based Key Exchange Protocosl in the UC framework," and insert -- "Efficient Two-Party Password-Based Key Exchange Protocol in the UC framework," --, therefor.

On the Title Page, item (56), under "OTHER PUBLICATIONS", in Column 2, Line 6, delete "Communication"" and insert -- Communication," --, therefor.

On the Title Page, item (57), under "ABSTRACT", in Column 2, Line 5, delete "selected" and insert -- generated --, therefor.

On the Title Page, item (57), under "ABSTRACT", in Column 2, Line 6, delete "selected" and insert -- generated --, therefor.

On Title Page 2, item (56), under "OTHER PUBLICATIONS", in Column 1, Line 20, delete "408" and insert -- 408, --, therefor.

In the Drawings:

In Fig. 4, Sheet 3 of 5, delete " 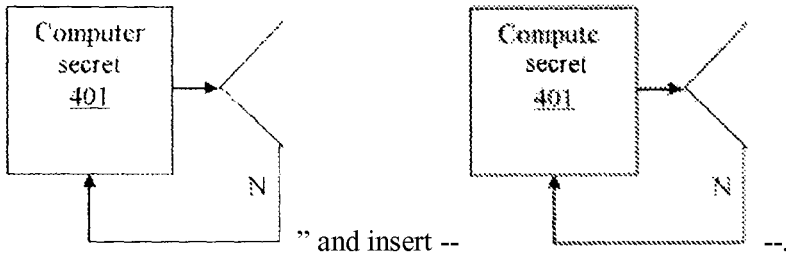 " and insert -- --, therefor.

Signed and Sealed this
Twenty-third Day of July, 2013

Teresa Stanek Rea
*Acting Director of the United States Patent and Trademark Office*

CERTIFICATE OF CORRECTION (continued)
U.S. Pat. No. 8,428,254 B2

In the Specification

In Column 1, Line 7, delete "authenticated" and insert -- authenticated, --, therefor.

In Column 8, Line 8, delete "660" and insert -- 660, --, therefor.

In the Claims

In Column 10, Line 10, in Claim 1, delete "number sets" and insert -- numbers --, therefor.

In Column 10, Line 27, in Claim 3, delete "1" and insert -- 1, --, therefor.

In Column 10, Line 55, in Claim 10, delete "the wherein" and insert -- wherein the --, therefor.

In Column 10, Line 65, in Claim 11, delete "cofigured" and insert -- configured --, therefor.

In Column 11, Line 11, in Claim 11, delete "derivate" and insert -- derivative --, therefor.

In Column 12, Line 30, in Claim 15, delete "another" and insert -- the another --, therefor.